United States Patent [19]

Gee

[11] 3,776,455
[45] Dec. 4, 1973

[54] TERMINAL GUIDANCE SYSTEM
[75] Inventor: Shu W. Gee, Lancaster, Canada
[73] Assignee: The United States of America as represented by the Administrator of the National Aeronautics and Space Administration, Washington, D.C.
[22] Filed: Mar. 6, 1972
[21] Appl. No.: 232,021

[52] U.S. Cl... 235/150.22, 235/150.26, 235/150.27, 244/77 A, 244/77 B, 343/108 R
[51] Int. Cl. ............................................. G06g 7/78
[58] Field of Search .................... 235/150.2, 150.22, 235/150.23, 150.26, 150.27; 343/102, 107, 108 R; 318/583; 73/178 R, 178 T; 244/77 A, 77 B

[56] References Cited
UNITED STATES PATENTS
3,177,348 4/1965 Daniloff ...................... 244/77 B X
3,361,391 1/1968 Medlinski ......................... 244/77 B
3,345,632 10/1967 Rover, Jr. ....................... 343/108 R
3,573,827 4/1971 DeBotton et al. ................ 343/108 R
3,355,733 11/1967 Mitchell et al. ............. 235/150.22 X

Primary Examiner—Charles E. Atkinson
Assistant Examiner—Jerry Smith
Attorney—Darrell G. Brekke et al.

[57] ABSTRACT

A terminal guidance system including a heading command subsystem and a glide-slope command subsystem which develop command signals for use in guiding an aircraft or other vehicle into a preselected heading and/or altitude at a terminal point. The heading command subsystem is responsive to certain input data and continuously develops command signals for use in directing the aircraft from a remote location to a terminal point in such a manner that upon arrival it has a preselected terminal heading. The glide-slope command subsystem is responsive to certain other input data and continuously develops command signals for use in controlling the rate of descent of the aircraft in such a manner that it will have a preselected altitude and glide-slope upon arrival at the terminal.

14 Claims, 12 Drawing Figures

Fig_1

Fig_2

Fig_3

Fig_4

Fig_5

Fig_6A

Fig_6B

Fig_8

Fig.7

Fig_9

Fig_10

Fig_11

TERMINAL GUIDANCE SYSTEM

The invention described herein was made by an employee of the United States Government and may be manufactured and used by or for the Government for governmental purposes without the payment of any royalties thereon or therefor.

BACKGROUND OF THE INVENTION

Field of the Invention

The present invention relates generally to terminal guidance systems for vehicles and, more particularly, to a system for enabling a vehicle to make a controlled approach to a terminal in such a manner that upon arrival the vehicle has a preselected altitude and/or heading.

Discussion of the Prior Art

In piloting vehicles such as aircraft, large ocean going vessels, and other means which are not constrained to follow a predetermined path of movement, it is often necessary that the vehicle have a particular altitude and/or heading when arriving at a terminal or reference point. For example, in the case of a landing aircraft, the rate of descent must be controlled and the ground track of the aircraft must be aligned with the runway.

Conventional methods used by aircraft in making an instrument approach to an airfield do not always result in the aircraft being aligned with the landing runway. For example, a pilot making a conventional VOR instrument approach to the Vay Nuys Airport in Vay Nuys, California, will, upon completion of an approach to the field, find himself 500 feet over the end of the runway (VOR station) and heading directly across the runway with visibility conditions of approximately 1 mile. The pilot is then required to stay below 500 feet, make a 270° turn, and maneuver his aircraft back to the runway for landing. Such approaches depend to a substantial degree on the visual acuity and judgement of the pilot.

Although the pilots of large ocean going vessels are obviously not concerned with changes in altitude, they are, due to limited maneuverability at operating speeds, concerned with having means at their disposal for enabling them to steer their vessel in a manner such that it will follow a particular track when approaching a bridge opening, channel mouth or in-motion rendezvous with another vessel. A substantial savings in time and operating costs would be obtained if it was no longer necessary to reduce the operating speed of the vessel merely for the sake of close tolerance navigation. Because similar heading control conditions apply to both seacraft and aircraft, principles similar to those used to control aircraft heading and ground track are thus applicable for navigation of seacraft.

SUMMARY OF THE PRESENT INVENTION

It is therefore an object of the present invention to provide an onboard terminal guidance system for enabling a vehicle approaching a terminal point to be guided in a manner which will assure that it have a particular heading and/or ground track upon its arrival.

Another object of the present invention is to provide a terminal guidance system for enabling an aircraft to be flown along a descending approach path in such a manner that it will have a predetermined altitude and heading upon arriving at the terminal point.

Briefly, the present invention relates to a terminal guidance system including a heading command subsystem and a glide-slope command subsystem which develop command signals for use in guiding an aircraft into a preselected heading and altitude at a terminal point. The heading command subsystem continuously develops command signals which enable the aircraft to be directed from a remote location to the terminal point in such a manner that upon arrival it has a preselected terminal heading. The glide-slope command subsystem continuously develops command signals which enable the rate of descent of the aircraft to be controlled in such a manner that it will have a prescribed altitude upon arrival at the terminal.

One of the primary advantages of the present invention is that all of the system components are airborne and require no special ground equipment other than the conventional VOR/DME station.

Another advantage of the present invention is that it enables a vehicle to be navigated from any remote point, within range of the terminal radio station, to the terminal without requiring that it follow a predetermined path.

Still another advantage of the present invention is that it allows the pilot of the aircraft to select a glide-slope and terminal approach traverse which is suitable to the requirements of his aircraft or the comfort of his passengers.

Other advantages of the present invention will no doubt become apparent to those skilled in the art after having read the following detailed description of the preferred embodiments which are illustrated in the several figures of the drawing.

DETAILED DESCRIPTION OF THE PREFERRED EMBODIMENTS

Figure 1:
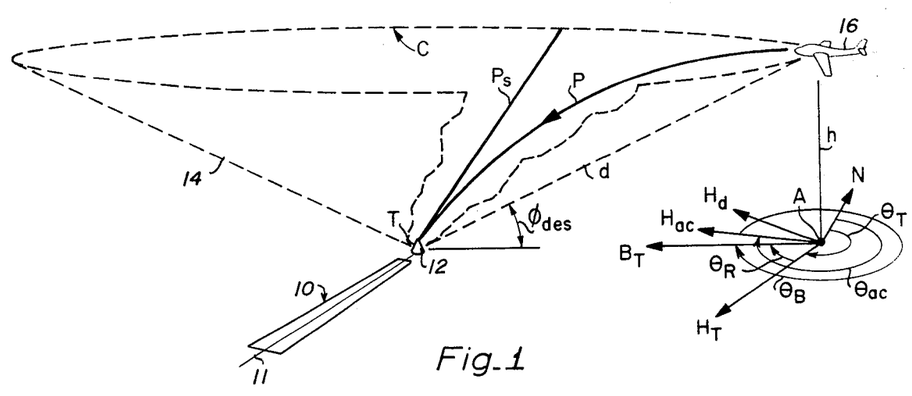
FIG. 1 is a perspective diagram generally illustrating a presently preferred method of operation of the present invention.

Referring now to FIG. 1 of the drawing, a runway 10 is shown along with a VHF omnidirectional range (VOR) transmitter tower 12 which is aligned with the center line 11 of runway 10 and located a suitable distance from one end thereof. Tower 12 might, for example, be located at an outer marker or at a point that coincides with the localizer and glide-slope beams of an instrument landing system (ILS). Shown in dashed lines and with its apex located at the top of tower 12 is an imaginary, inverted right circular cone C having a conical surface 14 and a cone half angle of $(90° - \phi_{des})$, where $\phi_{des}$ is the guide-slope angle chosen by the pilot of an aircraft 16 approaching the terminal T. As employed herein, "glide-slope" means the horizontal angle of the aircraft with respect to a selected point.

With the exception of the conventional VOR/DME station 12 located at terminal T, all of the components necessary to enable an aircraft to, in effect, define an imaginary conical surface 14, and to follow such surface to terminal T are carried onboard the aircraft.

The arrows shown located in a horizontal plane passing through the apex of cone C and radiating from the point A lying immediately beneath aircraft 16, indicate respectively, the heading $H_{ac}$ of aircraft 16 (measured from magnetic north by the angle $\theta_{ac}$), the aircraft bearing $B_T$ to terminal T, the selected terminal heading $H_T$ which the aircraft is to have upon reaching terminal T, and the desired heading $H_d$ of the aircraft 16 at point A, as computed by the heading control subsystem of the present invention. The letter "$h$" indicates the altitude of aircraft 16 above the terminal elevation and the letter "$d$" represents the slant range distance between aircraft 16 and terminal T.

As will be further discussed below, the terminal heading $H_T$ (measured from magnetic north by the angle $\theta_t$) may be selected as the heading of runway 10, or as some other heading. For example, $H_T$ might represent the wind corrected heading required in order to cause aircraft 16 to track along the center line 11 of runway 10 after passing over the terminal T. As another example, $H_T$ might correspond to the heading of a crosswind runway (not shown) whose center line intersects terminal T.

The invention permits aircraft 16 to arrive at terminal T (or at a desired altitude above T) with a desired heading. In accordance with the invention, the descent of aircraft 16 to terminal T is along a path P on the surface of the cone C. Depending on the initial and final headings of the aircraft, the descent path is either linear or curvilinear. Path $P_s$ represents a linear descent path (on the surface of cone C) in alignment with runway center line 11.

Figure 2:
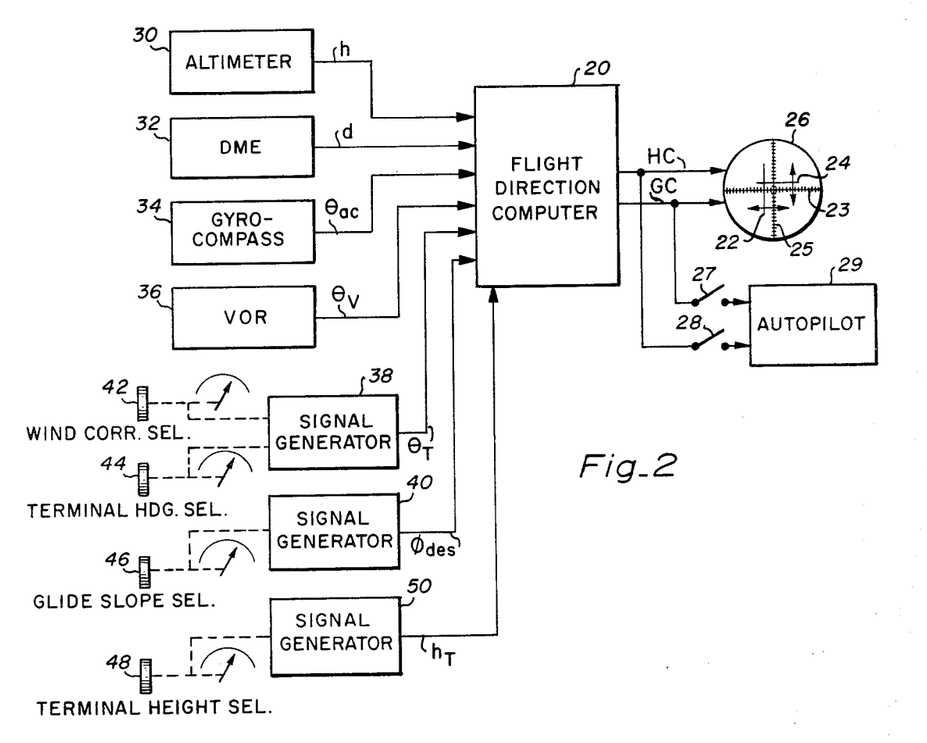
FIG. 2 is a block diagram of an illustrative embodiment of a terminal guidance system in accordance with the present invention.

In FIG. 2 of the drawing, the onboard equipment carried by aircraft 16 in order to practice the present invention is schematically illustrated. Such equipment might, for example, include a flight direction computer 20 which is programmed to respond to at least seven input signals $h$, $d$, $\theta_{ac}$, $\theta_v$, $\theta_T$, $\phi_{des}$, and $h_T$, and which is operative to develop a heading command signal HC for driving the command indicator 22, and a glide-slope command signal GC for driving the glide-slope command indicator 24, of a guidance command display unit 26. Display unit 26 may be of any suitable electronic or electro-mechanical form which is capable of responding to the electrical input signals HC and GC in order to display the command data to the pilot. By closing switches 27 and 28, the aircraft may be guided automatically to the terminal point by autopilot 29.

Electrical signals corresponding to $h$, $d$, $\theta_{ac}$, and $\theta_V$ for input to computer 20 are developed by conventional onboard aircraft equipment such as the radar altimeter 30, distance measuring equipment (DME) 32, gyrocompass 34, and VOR receiver 36. The input signals corresponding to $\theta_T$, $\phi_{des}$, and $h_T$ are developed by signal generators 38, 40 and 50. Signal generator 38 might, for example, be responsive to a manually adjustable wind correction selector 42, and a manually adjustable terminal heading selector 44, and be operative to combine the inputs from these selectors to develop a signal proportional to the angle $\theta_T$. The desired $\phi_{des}$ and $h_T$ (altitude above terminal T) are selected on glide slope selector 46 and terminal height selector 48, respectively. Selectors 42, 44, 46 and 48 may be, for example, potentiometers controlling voltage magnitudes.

The provision of heading command and glide-slope command signals requires that the heading error and elevation error, respectively, be compared with their derivatives to provide quickening or lead information in the display to the pilot that will result in smooth convergence to a desired flight path. A command signal is satisfied (zero) in the presence of an error if the appropriate rate of reducing this error is also present. Computer 20 is programmed to develop the command signals HC and GC in response to the input signals in accordance with the relationships $$HC = \theta_E - d\theta_E/dt \qquad 1$$

and $$GC = \phi_E - d\phi_E/dt \qquad 2$$

where
$\theta_E$ is the heading error angle, and
$\phi_E$ is the glide-slope error angle.

The heading error angle ($\theta_E$) may be expressed as $$\theta_E = \theta_R + \theta_B - 360 \qquad 3$$

where the reference angle $\theta_R$ is the angle between the aircraft bearing to the terminal and the desired heading at terminal T, $\theta_B$ is the relative heading of the aircraft to terminal T, and 360° provides the direction of the error. As indicated above, the terminal heading $\theta_T$ might be either the runway heading or the runway heading plus (or minus) a wind correction angle.

In the glide-slope command equation, the elevation error, $\phi_E$ is defined as $$\phi_E = \phi'_{ac} - \phi_{des} \qquad 4$$

where $\phi'_{ac}$ is derived from $h$, $h_T$, and $d$.

The flight direction computer 20 may be an analog or digital computer programmed in accordance with equations (1) and (2) or may be comprised of separate and independent data comparing and signal generating entities which respond to certain ones of the described input signals. In order to further explain the present invention, the terminal guidance system illustrated generally in FIGS. 1 and 2 will now be divided into two subsystems which are referred to as the heading command subsystem and the glide-slope command subsystem.

THE HEADING COMMAND SUBSYSTEM

Figure 3:
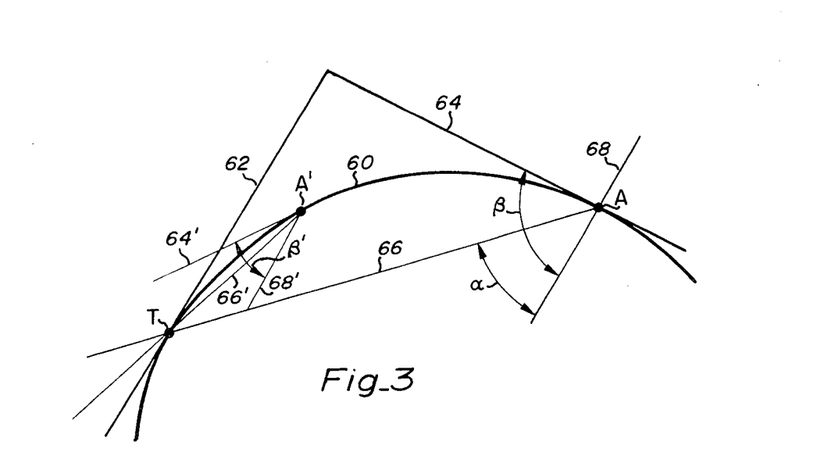
FIGS. 3, 4, 5, 6a and 6b illustrate the operational principles of a heading command subsystem in accordance with the present invention.
Figure 4:
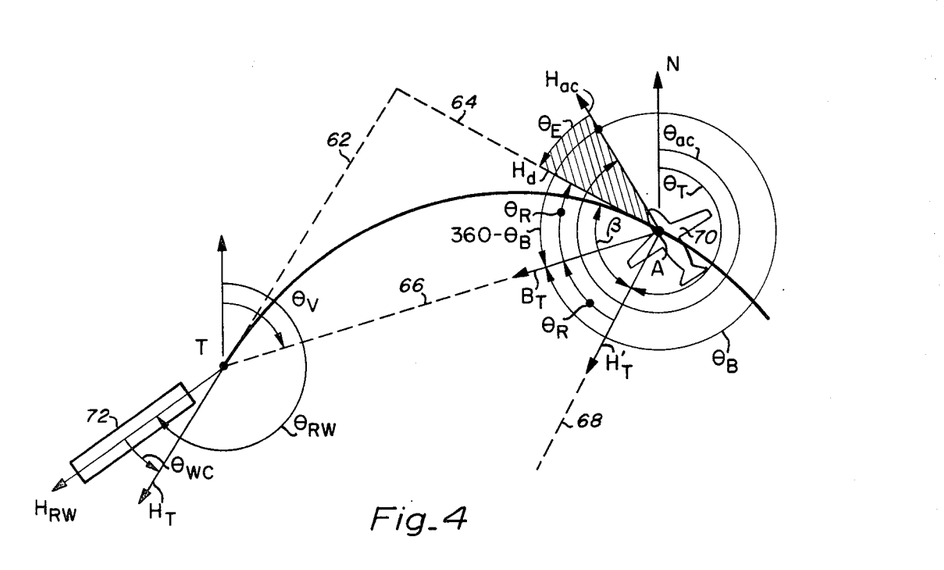

The underlying operational principles of the heading command subsystem are generally illustrated in FIG. 3 of the drawing and are more particularly demonstrated in FIG. 4. Referring now to FIG. 3, a pair of points T and A are shown having a circular segment 60 connecting them such that segment 60 is tangent to a line 62 passing through the point T. By constructing a line 64 tangent to segment 60 at point A and a line 66 connecting points T and A, and then drawing a line 68 parallel to line 62 and through point A, it will be noted that line 66 bisects the angle $\beta$ formed by the intersection of lines 64 and 68. Similarly, it can be seen that if another line 64' is drawn tangent to segment 60 at any other point A' along segment 60, the line 66' connecting points T and A' will again bisect the angle $\beta'$ formed by the intersection of lines 64' and 68'. Note also that as point A is moved along segment 60 toward point T, the angle $\beta$ decreases and converges on 0° at point T. This indicates that by knowing the direction of a line 62 (and thus the direction of line 68) and the direction of a line 66 connecting T and any point A, then their angle of intersection $\alpha$ can be determined and since $\beta = 2\alpha$, a line 64 can be constructed for use as a directional reference which rotates into coincidence with line 62 as the point A approaches point T. Bear in mind that point A need not be restricted to movement along the circular segment 60 since at any other point A'', a new circular segment can be constructed with a tangent to line 62 and passing through the new point A'', and a new set of lines 64'', 66'' and 68'' can likewise be constructed intersecting at that point.

In FIG. 4, the use of the principles illustrated in FIG. 3 to provide guidance control in accordance with the present invention are illustrated. An aircraft 70 is shown located at point A and a runway 72 is shown having its longitudinal axis intersecting a terminal point T. An arrow $H_T$ represents the desired terminal heading and is shown radiating from point T along line 62. A similarly oriented arrow $H'_T$ is shown emanating from point A and lying along the line 68. The arrow $H_{ac}$ lies along the longitudinal axis of aircraft 70 and indicates the aircraft's heading at point A. The arrow $H_d$ represents the desired heading of aircraft 70 at point A and lies along line 64. The arrow $B_T$ represents the aircraft bearing to terminal T and lies along line 66. Note that the desired terminal heading, as indicated by arrow $H_T$, is not coincident with the runway heading, indicated by arrow $H_{RW}$, but intersects $H_{RW}$ at an angle $\theta_{wc}$ which in this case represents the wind correction angle required to make aircraft 70 "track" along the center line of runway 72. The wind correction angle $\theta_{wc}$ may be calculated using the equation $$\theta_{WC} = \sin^{-1}(W\sin\theta / AS\ Wr)$$

where
  W is the wind velocity,
  $\theta_{wr}$ is the angle between the wind vector and the runway direction, and
  AS is the air speed of the aircraft; however, in actual practice, it would be adequate for the pilot to estimate this angle and manually insert the information into the system.

A signal proportional to the aircraft heading angle $\theta_{ac}$ can be obtained from the gyrocompass 34, as illustrated in FIG. 2; the terminal heading angle $\theta_T$ can be determined by adding (or subtracting) the wind correction angle $\theta_{wc}$ from the runway heading angle $\theta_{RW}$; and $\theta_V$, which is the bearing angle or VOR radial, can be obtained from the output of VOR 36. By comparing the VOR bearing angle $\theta_V$ with the aircraft heading $\theta_{ac}$, the relative angle $\theta_B$ to the terminal T is derived. $\theta_B$ is computed using the equation $$\theta_B = \theta_V + 180 - \theta_{ac} \qquad 6$$

The term $\theta_V + 180$ is the aircraft bearing to the terminal T. By observation it can be seen in FIG. 4 that since line 66 bisects the angle between 64 and 68, the following reference angle $\theta_R$ may be defined $$\theta_R = \theta_V + 180 - \theta_T \qquad 7$$

and $$\theta_R = (360 - \theta_B) - \theta_E \qquad 8$$

Letting $-\theta_E$ denote a heading error to the LEFT, then the heading error angle may be expressed, $$-\theta_E = \theta_R - 360 + \theta_B \qquad 9$$

or, in terms of the input signals available to the computer 20

$$-\theta_E = 2\theta_V - \theta_T - \theta_{ac} \qquad 10$$

Figure 5:
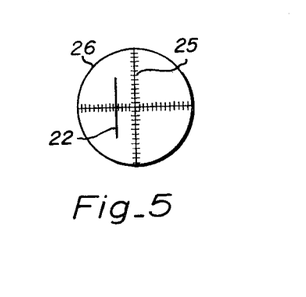
Figure 6A:
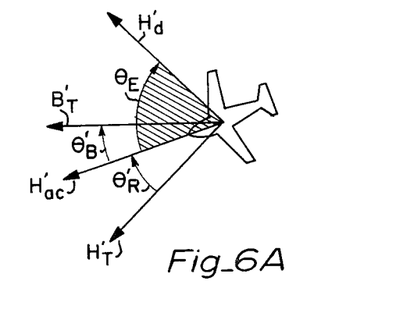
Figure 6B:
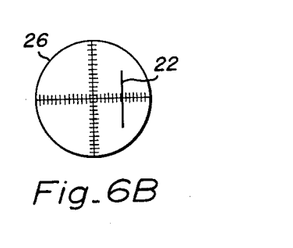

Since the heading error angle $\theta_E$ between the aircraft heading and the desired heading can be determined by solving the above equations, it will be apparent that by developing command signals which are proportional to $\theta_E$, aircraft 70 can be flown in accordance therewith in such a manner that upon reaching terminal T, it will have the desired terminal heading and will thus track directly along the center line of runway 72. For example, if the heading command display unit 26 includes a vertical indicator 22, then a heading command signal commensurate with the "left turn" error angle $\theta_E$ shown in FIG. 4, might resemble that illustrated in FIG. 5. The positioning of indicator 22 to the left of center line 25 indicates to the pilot that he must turn his aircraft to the left, i.e., "toward the needle", and the degree of the required turn, i.e., the magnitude of the heading error, is indicated by the positioning of indicator 22 relative to center line 25. Similarly, the positioning of indicator 22 in response to a heading command signal commensuarte with the "right turn" error angle $\theta'_E$, illustrated in FIG. 6A, might resemble that shown in FIG. 6B. When the pilot takes corrective action and turns the aircraft, a rate of change of the error angle is developed which tends to cancel the error signal — thus the positioning of indicator 22 on the center line 25 results when the appropriate corrective action is taken.

Figure 7:
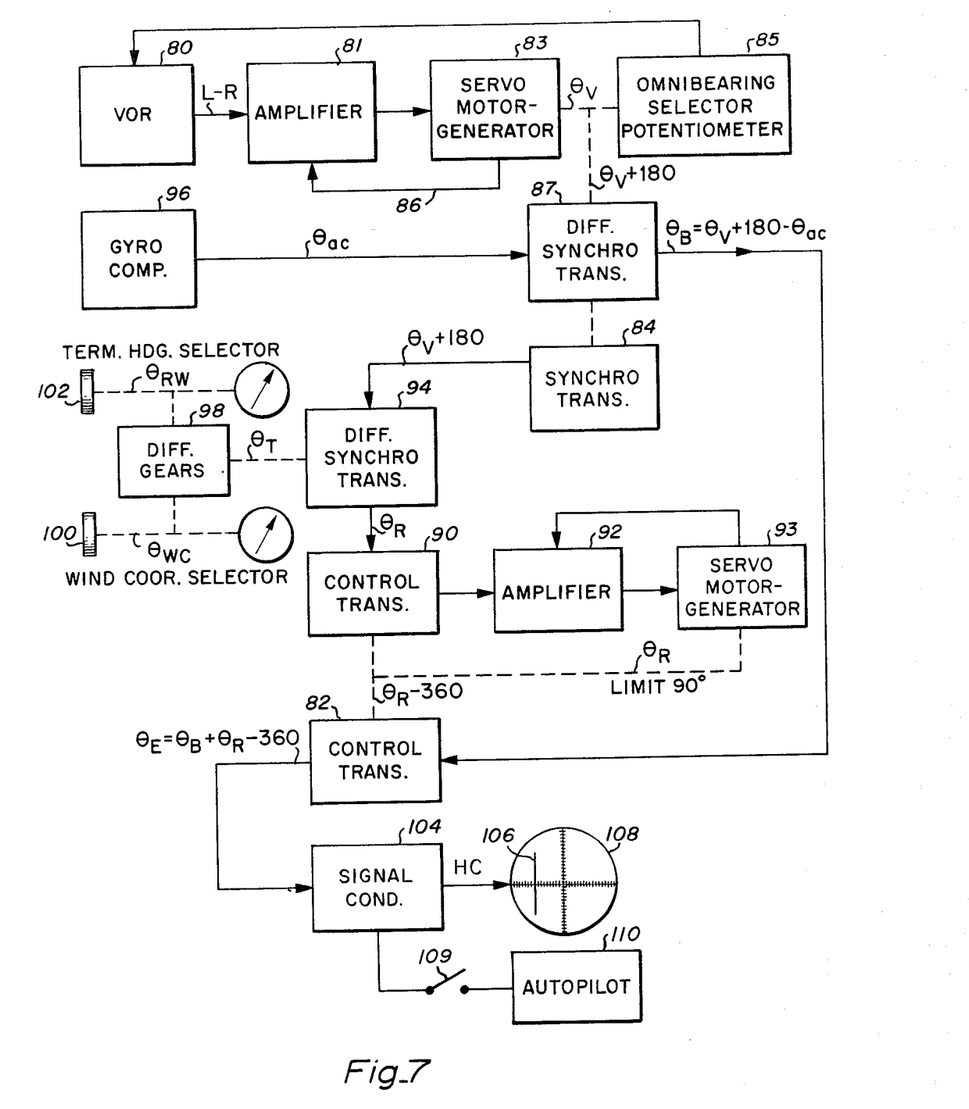
FIG. 7 is a block diagram illustrating an analog embodiment of a heading command subsystem in accordance with the present invention.

As an alternative to the utilization of the programmable computer 20 illustrated in FIG. 2, the heading command subsystem can be implemented using an analog embodiment such as that illustrated generally in FIG. 7 of the drawing. This embodiment includes a VOR receiver 80 for developing electrical output signals left and right with respect to the aircraft bearing angle $\theta_V$, a gyrocompass 96 for developing an aircraft heading signal proportional to the aircraft heading angle $\theta_{ac}$, and a wind correction selector 100, a runway heading selector 102, and the associated differential gears 98 for adding the selected wind correction and runway heading angle to obtain a mechanical output "signal" proportional to the desired terminal heading angle $\theta_T$. The left and right electrical signals from the VOR 80 is amplified by an amplifier 81 and used to drive servo motor-generator 83. A feedback signal from the generator section of motor-generator 83 is fed into amplifier 81. The electrical signals that represent the omnibearing reference from VOR 80 is also input to the omnibearing selector 85 which is mechanically geared to servo motor-generator 83. The left and right signals from VOR 80 are reduced to zero when the mechanical shaft of omnibearing selector 85 is positioned to bearing angle $\theta_V$. The shaft of a differential synchro transmitter 87 is positioned at 180° from $\theta_V$. An electrical signal proportional to the aircraft heading $\theta_{ac}$ is received from a gyrocompass system 96 and is input to differential synchro transmitter 87. The output of transmitter 87 is $\theta_V + 180 - \theta_{ac}$, which is an electrical signal proportional to the relative heading angle $\theta_B$. A synchro transmitter 84 is also positioned on the $\theta_V$ shaft, and its electrical output, which is proportional to $\theta_V + 180°$, is fed to a differential synchro transmitter 94. The rotor of differential synchro transmitter 94 is mechanically connected to the $\theta_T$ shaft and the output signal is proportional to $\theta_R$ as per equation (7). The $\theta_R$ signal is transformed into a mechanical shaft position as follows: the electrical signal $\theta_R$ is input into a control transformer 90, the rotor of which is fed to an operational amplifier 92. The amplifier output drives a motor-generator 93 which repositions the shaft of control transformer 90 until a mechanical shaft position proportional to $\theta_R$ is reached. Also attached to the $\theta_R$ shaft, but geared for reversed rotation, is a control transformer 82, which is electrically excited with a $\theta_B$ signal from differential synchro transmitter 87. The electrical output from the rotor of control transformer 82 is proportional to $\theta_E$ as per equation (9). A signal conditioner 104 is responsive to the output of control transformer 82 and is operative to develop a heading command signal HC for driving the indicator 106 of the command display unit 108, or autopilot 110 when switch 109 is closed. It will of course be appreciated that as an alternative to providing "command" type indications as described above, the indicators could be made responsive to simply the error signals. The problem with this, however, is that when the error signal is large, it is possible for the pilot to over-correct for the error which could result in an oscillatory convergence to a curved path. The rate of change of the error is therefore derived from the error signal, and this rate signal opposes the error in signal conditioner 104 to form the heading command signal HC as per equation (1). The resulting command display signal, when kept at zero by the pilot, provides smooth convergence to a curved path.

In order to use this system as a means for guiding an aircraft or seacraft to a terminal having an operative VOR transmitter, all the pilot need do is tune the VOR 80 to the terminal frequency, adjust the wind correction selector 100 to an appropriate setting, and adjust the heading selector 102 to the ground track heading desired at the terminal. Heading commands will then be displayed on unit 108 which, if followed, will cause the vehicle to arrive at the terminal with the selected terminal heading. As an alternative means of obtaining the relative bearing angle $\theta_B$, note that an onboard directional radar or an automatic direction finding (ADF) radio could be used to locate the terminal point. This would, of course, be the more likely alternative in the case of seacraft applications since such equipment is usually already available, whereas the equivalent of a VOR station at the terminal (bridge, channel opening, etc.) is not.

Glide-Slope Command Subsystem

Figure 8:
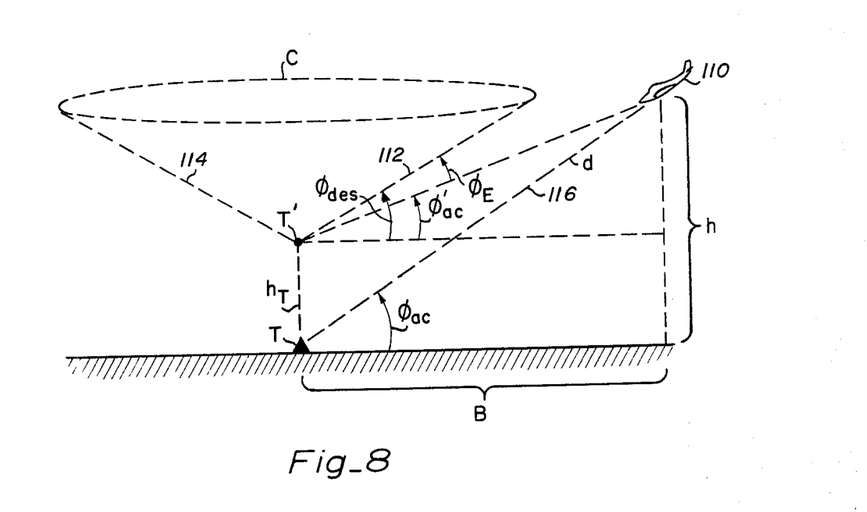
FIG. 8 is a diagram illustrating the operational principles of a glide-slope control subsystem in accordance with the present invention.

Turning now to FIG. 8 of the drawing, the operational principles of the glide-slope command subsystem are illustrated by considering an aircraft 110 flying toward terminal T', and comparing its position to a reference line 112, which is a straight line lying on the surface 114 of an elevated "glide-slope cone" C, and which intersects terminal T' at an angle $\phi_{des}$. Having imputed the desired glide-slope angle $\phi_{des}$ and terminal altitude $h_T$ into computer 20 (FIG. 2) by adjusting glide-slope selector 46 and terminal height selector 48, the position of line 112 is established. The position of the line 116, connecting the instanteous position of aircraft 110 and terminal T, may be established by measuring the altitude $h$ and the slant range distance d to the station and using these dimensions to determine the aircraft position angle $\phi_{ac}$ and length of base B. The value of B and $(h - h_T)$ are used to compute a new $\phi'_{ac}$. By then subtracting $\phi'_{ac}$ from $\phi_{des}$, the glide-slope error angle $\phi_E$ is determined and used to develop a glide-slope command signal commensurate therewith. These operations are, of course, carried out by computer 20 in response to the signals developed by altimeter 30 and DME 32. As in the previously described heading command subsystem, the glide-slope command signal is used to drive an indicator which, in this case, shows the pilot that he must adjust his glide-slope either up or down in order to acquire and stay on the surface 114 of cone C.

Figure 9:
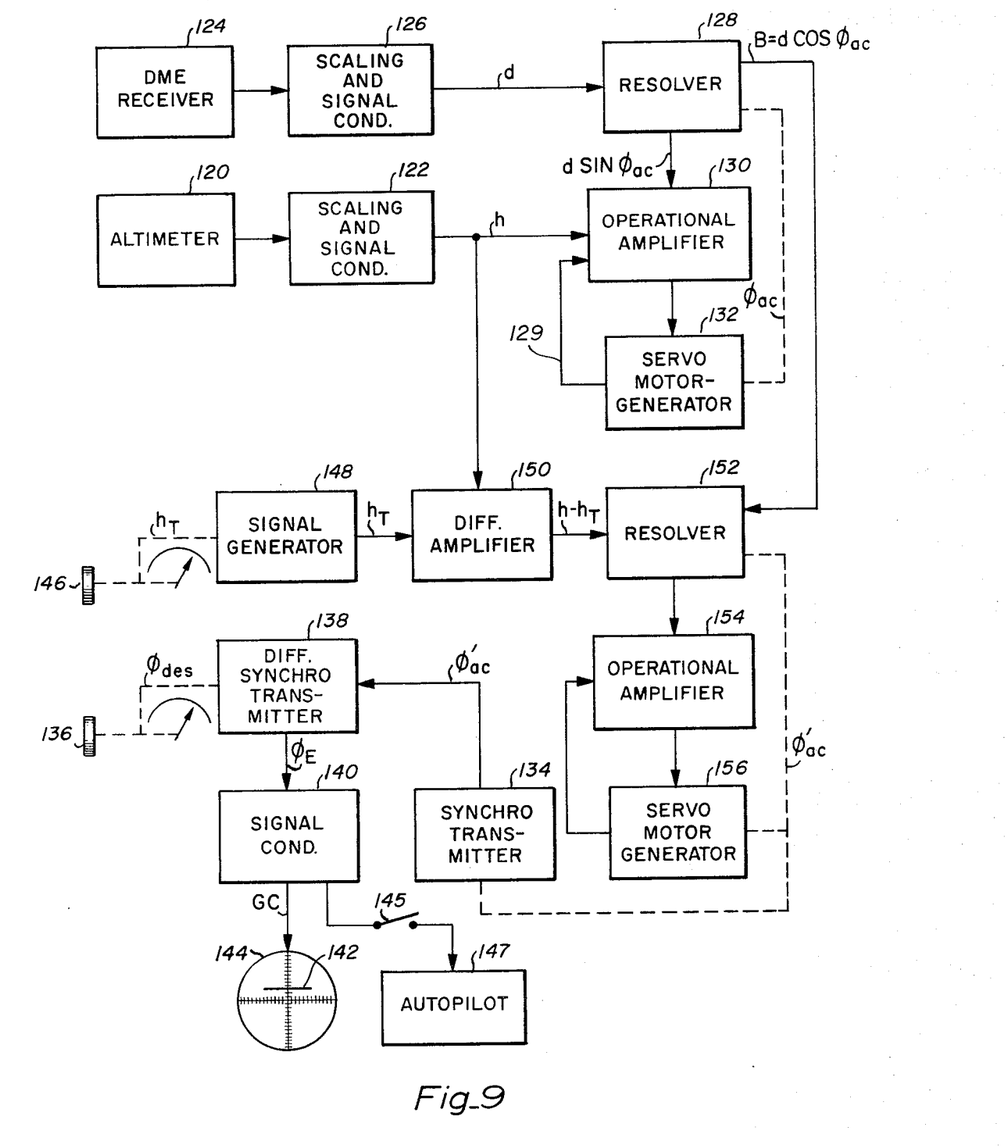
FIG. 9 is a block diagram illustrating an analog embodiment of a glide-slope control subsystem in accordance with the present invention.

As an alternative to the use of computer 20 as the computational instrument, an analog embodiment such as is illustrated in FIG. 9 of the drawing, can be utilized to develop the glide-slope command signals. This embodiment includes an altimeter 120, a scaling and signal conditioner 122 for developing a signal proportional to altitude $h$, a DME receiver 124, and a scaling and signal conditioner 126 for developing a signal proportional to the distance d to terminal T. A resolver-servo including a resolver 128, an operational amplifier 130 and a servo motor-generator 132, is used to develop a mechanical output "signal" proportional to the aircraft elevation angle $\phi_{ac}$, in response to input electrical signals corresponding to $h$ and $d$. The generator portion of motor-generator 132, when in motion, develops a feedback signal which is fed into amplifier 130 by lead 129. When resolver 128 is energized with the signal $d$, two signals are generated, one proportional to $d \sin \phi_{ac}$ and one proportional to $d \cos \phi_{ac}$. When $d \sin \phi_{ac}$ is made equal to $h$, the computing process is completed and the results are a mechanical shaft position where $$\phi_{ac} = \sin^{-1}(h/d) \qquad 11$$

and an electrical signal where $$B = d \cos \phi_{ac} \qquad 12$$

Signal generator 148 converts a mechanical position of the terminal height selector 146 to an electrical signal $h_T$ which is fed to differential amplifier 150. Signal $h$ is also fed to differential amplifier 150 where the output is $h - h_T$. The output B from resolver 128 and the ($h - h_T$) signal is used to compute $\phi'_{ac}$. When the sine and cosine windings of resolver 152 are excited with signals ($h - h_T$) and B, respectively, the electrical signal from one of the output windings is fed to operational amplifier 154 which drives servo motor-generator 156 until the signal has been reduced to zero. The result is a shaft position proportional to the glide-slope angle of the aircraft with respect to T'

$$\phi_{ac} = \tan^{-1}(h - h_T/B).$$

(The electrical signal that results at the other output winding of resolver 152 is proportional to $(h-h_T)^2 + B^2$; however, this signal is not used.) A synchro transmitter 134 senses the mechanical shaft position and provides an electrical output signal proportional to $\phi'_{ac}$. The desired glide-slope reference angle $\phi_{des}$ is selected by adjusting selector 136, and a comparator means, such as the differential synchro transmitter 138, is utilized to functionally subtract $\phi'_{ac}$ from $\phi_{des}$, and to develop a glide-slope error signal proportional to the glide-slope error angle $\phi_E$. The output of transmitter 138 is fed into a signal conditioner 140 which develops a glide-slope command signal GC for driving the glide-slope command indicator 142 of a display unit 144 or autopilot 146 when switch 145 is closed.

Operation of the Terminal Guidance System

Figure 10:
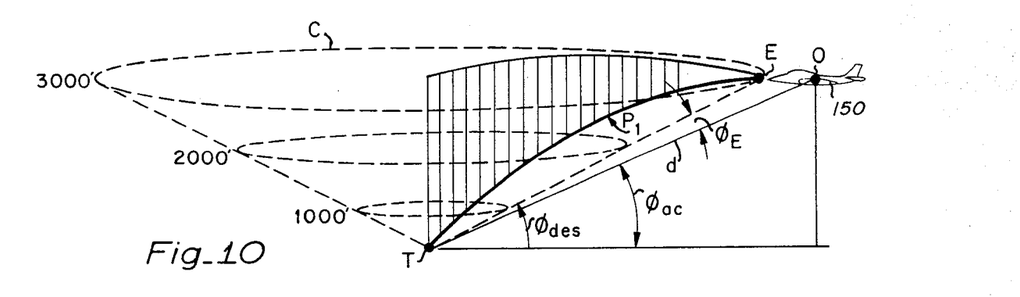
FIGS. 10 and 11 are further diagrams used in explanation of the operation of the terminal guidance system of the invention.
Figure 11:
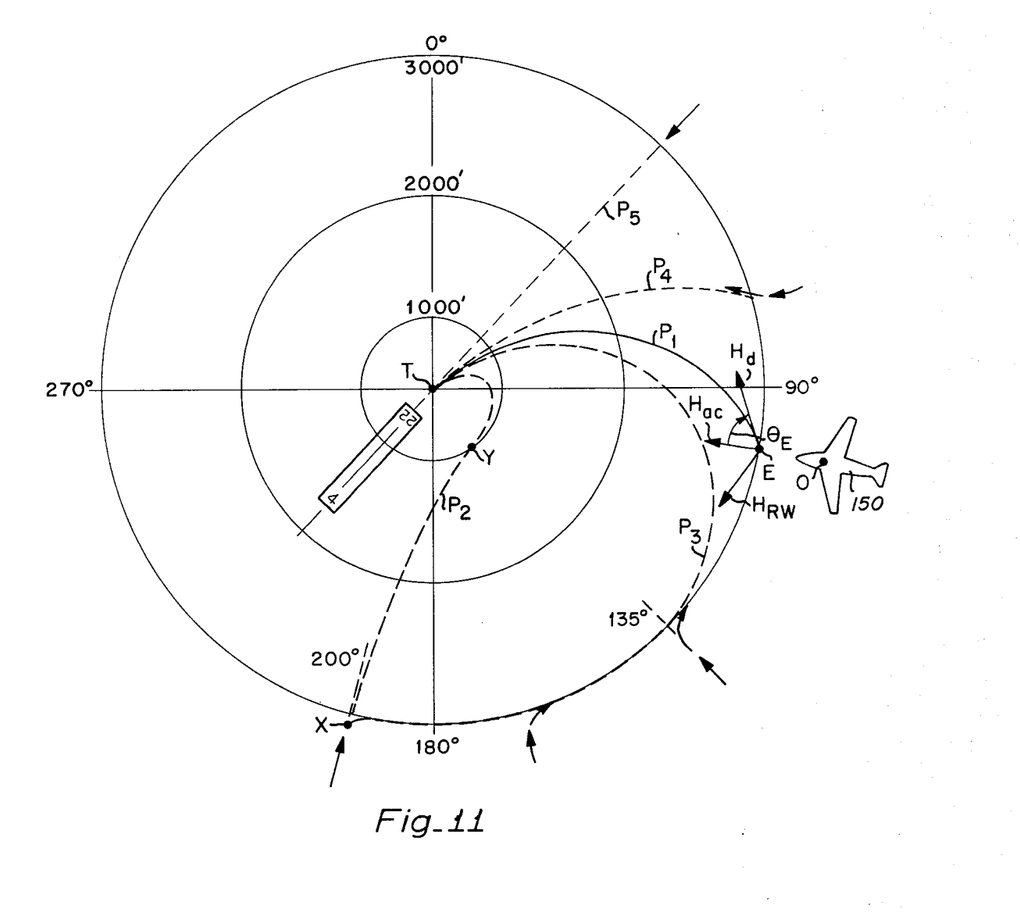

Having thus individually defined the operation of the guidance command subsystem and the pitch command subsystem which are combined to make up the terminal guidance system of the present invention, reference will now be made to FIGS. 2, 10 and 11 of the drawing to further illustrate the overall operation of the terminal guidance system.

Assuming that an aircraft 150, which is presently at an altitude of 3,000 feet and approaching terminal T on a 110° VOR radial, wishes to descend with a glide-slope angle of $\phi_{des}$ to make a landing on runway 22. If there is sufficient wind to warrant correction, the pilot will obtain the wind direction and velocity from an appropriate control tower or other source, compute the required wind correction angle, and then adjust the wind correction selector 42. He will also adjust the runway heading selector 44° to 220°, adjust glide-slope selector 46 to the desired $\phi_{des}$, and adjust the terminal height selector 48 to perhaps 100 feet. As soon as these adjustments are made and computer 20 is actuated, heading command and glide-slope command signals will be developed and displayed on display unit 26 to indicate the corrective action the pilot must take in order to make the desired approach to runway 22.

When aircraft 150 is at the point 0, which is beneath the surface of the imaginary glide-slope cone C, the glide-slope indicator 24 will be positioned above the display unit horizontal center line 23 by a distance proportional to the glide-slope error angle $\phi_E$, indicating to the pilot that the aircraft is beneath the cone surface. At this point he may choose to either fly upwardly "toward the needle" to intersect the surface of cone C, or to continue ahead at the same altitude until the aircraft intersects the cone surface at point E. The upcoming intersection with the cone surface will be indicated by the continuous movement of indicator 24 toward center line 23.

At point 0 the heading command indicator 22 will be displaced to the right of the vertical center line 25, indicating that the aircraft must be turned in a northerly direction. A pilot experienced in using the terminal guidance system of the present invention will most likely immediately start a gradual turn to the right so as to intercept the surface of cone C at approximately point E with a heading as close as possible to the desired heading indicated by arrow $H_d'$. Once the cone surface is "acquired," as indicated by the central positioning of indicator 24, and the aircraft heading is corrected to coincide with the desired heading, as indicated by the centering of indicator 22, all the pilot need then do in order to make the desired approach to runway 22 is to fly his aircraft in such a manner as to keep the indicators 22 and 24 centered. By keeping the indicators centered, the aircraft's approach path to terminal T will resemble that illustrated by the line $P_1$ shown in FIGS. 10 and 11.

Note however, that it is not mandatory that the pilot strictly follow the indicated commands. For example, instead of following the circular path $P_1$ the pilot may wish to make a slightly different approach with a sharper turn near terminal T. This system permits the pilot to make such a choice and the position of indicator 22 will illustrate, in terms of heading error, the magnitude of the turn required in order to pass over terminal T will the selected terminal heading.

Note also, that since the heading command signals and the glide-slope command signls are independent, the pilot can choose to follow both signals simultaneously or independently of each other. By way of example, if an aircraft is located at the point X and is approaching terminal T along the 200° VOR radial the guidance command indicator 22 will command a sharp right turn to follow the surface of cone C at a constant altitude around to the 135° VOR radial, at which time the command indicators will start to indicate a left turn and descent along path $P_3$ into terminal T. An experienced pilot would however, upon intersecting the cone of surface C, be more likely to closely follow the glide-slope indicator, but only loosely follow the heading command indicator, as indicated by the dashed line $P_2$, until at some point Y (at perhaps 1000 feet above ground level) he would then follow both command signals simultaneously for the desired alignment at terminal T. The advantage in taking this alternative is to reduce flight time since the approach distance is shorter. The disadvantage is that a considerably higher bank angle is required which, at the low approach speeds usually involved, might present possible stall hazards or passenger discomfort, etc.; however, this can be prevented by applying limits on operational procedures for various aircraft.

The dashed lines $P_4$ and $P_5$ illustrate other possible paths which might be followed in using the present system while making approaches from more northerly directions. Although the approach paths illustrated all call for left turns into terminal T, it will be appreciated that for landing approaches from the left and top of the drawing, right turn approach paths similar to the illustrative left turn paths may be followed.

Whereas many additional alterations and modifications of the disclosed embodiments will no doubt become apparent to those skilled in the art, it is to be understood that this description is by way of illustration only and is not intended to be limiting. Accordingly, the appended claims are to be interpreted as covering all such alterations and modifications which fall within the true spirit and scope of the invention.

What is claimed is:

1. A system for guiding a vehicle to a point T' comprising:

means for determining the heading angle ($\theta_{ac}$) of said vehicle and developing a signal proportional thereto;

means for determining the bearing angle ($\theta_V$) of said vehicle from said point T' and developing a signal proportional thereto;

means for selecting a desired heading angle ($\theta_T$) at T' and developing a signal which is proportional thereto;

means for selecting a desired glide-slope angle ($\phi_{des}$) to T' and developing a signal porportional thereto;

means for determining the glide-slope angle ($\phi'_{ac}$) of said vehicle with respect to T' and developing a signal proportional thereto;

computer means for generating a heading command signal (HC) and a glide-slope command signal (GC) for use in directing said vehicle to said point T' so that upon arrival at said point T' the vehicle heading angle is coincident with said selected heading angle, said computer means being capable of solving the following equations $$-\theta_E = 2\theta_V - \theta_T - \theta_{ac}$$

$$\phi_E = \phi'_{ac} - \phi_{des}$$

$$HC = \theta_E - d\theta_E/dt$$

$$GC = \phi_E - d\phi_E/dt \text{ ; and}$$

display means comprising a fixed heading reference and a movable heading command indicator positioned responsive to said heading command signal such that the displacement of the movable heading command indicator relative to said fixed reference indicates the magnitude of the correction necessary to intercept the desired heading.

2. A system as claimed in claim 1 wherein said display means further comprises a fixed glide-slope reference and a movable glide-slope command indicator positioned responsive to said glide-slope command signal such that the displacement of the movable glide-slope command indicator relative to said fixed glide-slope reference indicates the magnitude of correction necessary to intercept the desired glide slope.

3. A system as claimed in claim 2 wherein said vehicle comprises an aircraft and said point T' lies along the centerline of a runway on which the aircraft is to land, said computer calculating a wind correction angle ($\theta_{wc}$) representative of the wind correction required to cause the aircraft to track along said centerline of said runway, said wind correction angle being algebraically added to a runway heading angle ($\theta_{RW}$) to determine the terminal heading angle ($\theta_T$).

4. A system for guiding a vehicle to a point T':

means for determining the heading angle ($\theta_{ac}$) of said vehicle and developing a signal proportional thereto;

means for determining the bearing angle ($\theta_V$) of said vehicle from said point T' and developing a signal proportional thereto;

means for selecting a desired heading angle ($\theta_T$ at T' and developing a signal which is proportional thereto;

means for selecting a desired glide-slope angle ($\theta_{des}$) to T' and developing a signal proportional thereto;

means for determining the glide-slope angle ($\theta'_{ac}$) of said vehicle with respect to T' and developing a signal proportional thereto;

said point T' being the apex of an imaginary inverted right circular cone having a cone half angle of ($90° - \phi_{des}$);

computer means coupled to said $\theta_{ac}$, $\theta_V$, $\theta_T$, $\theta_{des}$, and $\phi'_{ac}$ signals for generating a heading command signal and a glideslope command signal;

means coupled to said computer means and responsive to said command signals for, when operative, automatically guiding said vehicle to said point T' so that upon arrival at said point the heading angle of said vehicle coincides with said selected heading angle, the path followed by said vehicle being on the surface of said cone; and display means comprising a fixed heading reference, a movable heading command indicator positioned responsive to said heading command signal such that the displacement of the movable heading command indicator relative to said fixed heading reference indicates the magnitude of the correction necessary to intercept the desired heading, a fixed glide-slope reference, and a movable glide-slope reference command indicator displacement of responsive to said glide-slope command signal such that the displacement of the movable glide-slope command indicator relative to said fixed glide-slope reference indicates the magnitude of correction necessary to intercept the desired glide-slope.

5. A system for guiding a vehicle to a point T' located a desired height ($h_T$) over point T comprising:

means for determining the altitude ($h$) of said vehicle over T and developing a signal which is a function thereof;

means for determining the distance ($d$) between said vehicle and T, and developing a signal which is a function thereof;

means for determining the heading angle ($\theta_{ac}$) of said vehicle and developing a signal which is a function thereof;

means for selecting a desired heading angle ($\theta_T$) at T' and developing a signal which is a function thereof;

means for selecting a desired glid-scope angle ($\theta_{des}$) to T' and developing a signal which is a function thereof;

means for selecting said desired height ($h_T$) and developing a signal which is a function thereof;

means using said $d$, $h$, and $h_T$ signals for determining the glide-slope angle ($\theta'_{ac}$) of said vehicle with respect to T' and developing a signal which is a function thereof;

computer means for generating a heading command signal (HC) and glide-slope command signal (GC) for use in directing said vehicle to said point T' so that upon arrival at said point T' the vehicle heading is coincident with said selected heading angle, said computer means being capable of solving the following equations $$-\theta_E = 2\theta_V - \theta_T - \theta_{ac}$$
$$\phi_E = \phi'_{ac} - \phi_{des}$$
$$HC = \theta_E - d\theta_E/dt$$
$$GC = \phi_E - d\phi_E/dt \text{ ; and}$$

display means comprising a fixed heading reference, a movable heading command indicator positioned responsive to said heading command signal such that the displacement of the movable heading command indicator relative to said fixed heading reference indicates the magnitude of the correction necessary to intercept the desired heading, a fixed glide-slope reference, and a movable glide-slope reference command indicator positioned responsive to said glide-slope command signal such that the displacement of the movable glide-slope command indicator relative to said fixed glide-slope reference indicates the magnitude of correction necessary to intercept the desired glide slope.

6. A terminal guidance system, comprising:

means for determining the heading angle ($\theta_{ac}$) of a vehicle and developing a vehicle heading signal commensurate therewith;

means for determining the bearing angle ($\theta_V$) of said vehicle from a selected terminal T' and for developing a vehicle bearing signal commensurate therewith;

means for selecting a terminal heading angle ($\theta_T$) and developing a terminal heading signal commensurate therewith;

computing means programmed to determine an error angle ($\theta_E$) defined by the equation $$-\theta_E = 2\theta_V - \theta_T - \theta_{ac}$$

and to develop therefrom a heading command signal (HC) in accordance with the equation $$HC = \theta_E - d\theta_E/dt$$

for use in directing said vehicle so that upon arrival at said terminal T' the vehicle heading is coincident with the selected terminal heading ; and display means comprising a fixed heading reference and a movable heading command indicator positioned responsive to said heading command signal such that the displacement of the movable heading command indicator relative to the fixed reference indicates the magnitude of the correction necessary to intercept the desired heading.

7. A terminal guidance system as recited in claim 6, further comprising:

means for determining the altitude ($h$) of said vehicle relative to a terminal T below terminal T' and for developing an altitude signal commensurate therewith;

means for determining the distance ($d$) between said terminal T and said vehicle and developing a signal commensurate therewith;

means for selecting the height ($h_T$) of terminal T' above terminal T and developing a terminal height signal commensurate therewith;

means for selecting a desired glide-slope angle ($\phi_{des}$) to terminal T' and developing a signal commensurate therewith;

means for computing $\phi'_{ac}$ from said signals commensurate to $h$, $d$, and $h_T$ wherein $\phi'_{ac}$ is the real glide-slope angle of said vehicle with respect to T';

means for determining the glide-slope error angle ($\phi_E$) wherein $$\phi_E = \phi'_{ac} - \phi_{des}; \text{ and}$$

means to develop a glide-slope command signal (GC) in accordance with the equation $$GC = \phi_E - d\phi_E/dt$$

for use in directing said vehicle to terminal T';said display means comprising a fixed glide-slope reference and a movable glide-slope command indicator positioned responsive to said glide-slope command signal such that the displacement of the movable glide-slope command indicator relative to said fixed glide-slope reference indicates the magnitude of correction necessary to intercept the desired glide slope.

8. A system for guiding a vehicle to a point T' located a desired height ($h_T$) over point T comprising:

means for determining the altitude ($h$) of said vehicle relative to point T and developing a signal proportional thereto;

means for determining the distance ($d$) between said point T and said vehicle and developing a signal proportional thereto;

means for selecting said height ($h_T$) and developing a signal proportional thereto;

means for selecting a desired glide-slope angle ($\phi_{des}$) to point T' and developing a signal proportional thereto;

means for computing $\phi'_{ac}$ from said $h$, $d$, and $h_T$ signals wherein $\phi'_{ac}$ is the actual glide-slope angle of said vehicle with respect to T';

means for determining the glide-slope error angle ($\phi_E$) wherein $$\phi_E = \phi'_{ac} - \phi_{des};$$

means to develop a glide-slope command signal (GC) in accordance with the equation $$GC = \phi_E - d\phi_E/dt$$

for use in directing said vehicle to point T'; and display means comprising a fixed glide-slope reference and a movable glide-slope command indicator positioned responsive to said glide-slope command signal such that the displacement of the movable glide-slope command indicator relative to said fixed glide-slope reference indicates the magnitude of correction necessary to intercept the desired glide slope.

9. A terminal guidance system, comprising:

means for determining the heading of a vehicle and developing a vehicle heading signal commensurate therewith;

means for determining the bearing of said vehicle from a selected terminal and for developing a bearing signal commensurate therewith;

means for selecting a terminal heading and developing a terminal heading signal commensurate therewith;

computing means responsive to said vehicle heading signal, said bearing signal and said terminal heading signal, and operative to develop a heading error signal for use in directing said vehicle toward said terminal, so that upon arrival at said terminal, the vehicle heading is coincident with the selected terminal heading; and display means comprising a fixed heading reference and a movable heading command indicator positioned responsive to a command signal related to said heading error signal and the rate of change thereof such that the displacement of the movable heading command indicator relative to the fixed reference indicates the magnitude of the correction necessary to intercept the desired heading.

10. A terminal guidance system as recited in claim 9 wherein said heading error signal is commensurate with a heading error angle $\theta_E$, said terminal heading signal is commensurate with a terminal heading angle $\theta_T$, and said bearing signal is commensurate with vehicle bearing angle $\theta_V$, and said vehicle heading signal is commensurate with a vehicle heading angle $\theta_{ac}$, and wherein said computing means develops said heading error signal in accordance with the equation $$-\theta_E = 2\theta_V - \theta_T - \theta_{ac}.$$

11. A terminal guidance system as recited in claim 9 and further comprising:
means for determining the altitude of said vehicle relative to a reference and for developing an altitude signal commensurate therewith;
means for determining the distance between said terminal and said vehicle and developing a distance signal commensurate therewith;
means for selecting a desired glide-slope and developing a glide-slope reference signal commensurate therewith;
means for selecting a desired terminal height and developing a terminal height signal commensurate therewith; and
further computing means responsive to said altitude signal, said distance signal, said terminal height signal and said glide-slope reference signal and operative to develop a glide-slope error signal for use in directing said vehicle so that upon arrival at said terminal said vehicle is at said desired terminal height, said display means further comprising a fixed glide-slope reference and a movable glide-slope command indicator positioned responsive to said glide-slope error signal such that the displacement of the movable glide-slope command indicator relative to said fixed glide-slope reference indicates the magnitude of correction necessary to intercept the desired glide slope.

12. A terminal guidance system as recited in claim 11 wherein said glide-slope error signal is commensurate with a glide-slope error angle $\phi_E$, said altitude signal is commensurate with an altitude $h$, said distance signal is commensurate with a distance $d$, and said glide-slope reference signal is commensurate with a desired glide-slope angle $\phi_{des}$, and wherein said further computing means developing said glideslope error signal in accordance with the equation $$\phi_E = \phi'_{ac} - \phi_{des},$$

where $\phi'_{ac}$ is the glide-slope angle of the vehicle with respect to said terminal.

13. A terminal guidance system for use in guiding a vehicle from a remote point to a terminal point in a manner such that the vehicle has a predetermined terminal heading upon reaching said terminal point, comprising:

means for continuously determining the heading of the vehicle and developing a vehicle heading signal commensurate therewith;
means for continuously determining the bearing of the vehicle from said terminal point and developing a bearing signal commensurate therewith;
means for developing a terminal heading signal corresponding to said predetermined terminal heading;
first comparator means responsive to said vehicle heading signal and said bearing signal and operative to develop a difference signal commensurate with the difference between said vehicle heading signal and said bearing signal;
second comparator means responsive to said bearing signal and said terminal heading signal and operative to develop a reference angle signal;
third comparator means responsive to said difference signal and said reference angle signal, and operative to develop a heading error signal for use in guiding said vehicle; and
display means comprising a fixed heading reference and a movable heading command indicator positioned responsive to said heading error signal such that the displacement of the movable heading command indicator relative to the fixed reference indicates the magnitude of the correction necessary to intercept the desired heading.

14. Apparatus for use in guiding a vehicle at a first altitude to a terminal point T' at a second altitude located a desired height ($h_T$) over point T comprising:
means for determining the altitude ($h$) of said vehicle above point T and developing an altitude signal proportional thereto;
means for determining the distance ($d$) between said vehicle and said point T and developing a distance signal proportional thereto;
means for selecting a glide-slope reference angle ($\phi_{des}$) to said point T' and developing a glide-slope reference signal proportional thereto;
means for selecting said desired terminal height ($h_T$) and developing a terminal height signal proportional thereto;
means responsive to said altitude signal and said distance signal for developing a first glide-slope angle ($\phi_{ac}$) signal defined by the expression $$\phi_{ac} = \sin^{-1} h/d \; ; \; ^-(h -$$

means for developing a signal proportional to B wherein $$B = d \cos \phi_{ac};$$

means responsive to said altitude signal, said terminal height signal, and said B signal for developing a second glideslope angle ($\phi'_{ac}$) signal defined by the expression $$\phi'_{ac} = \tan^{-1} (h + h_T/B) \; ;$$

means responsive to said glide-slope reference signal and said second glide-slope angle signal for developing a vehicle error signal commensurate with a vehicle glide-slope error angle ($\phi_E$) defined by the expression $$\phi_E = \phi'_{ac} - \phi_{des} \; ; \text{ and}$$

display means comprising a fixed glide-slope reference and a movable glide-slope command indicator positioned responsive to said vehicle error signal such that the displacement of the movable glide-slope command indicator relative to said fixed glide-slope reference indicates the magnitude of the correction necessary to intercept the desired glide slope.

* * * * *

PO-1050
(5/69)

UNITED STATES PATENT OFFICE
CERTIFICATE OF CORRECTION

Patent No. 3,776,455　　　　　　　　Dated ________________

Inventor(s) SHU W. GEE

It is certified that error appears in the above-identified patent and that said Letters Patent are hereby corrected as shown below:

Column one of the title page, line 2, delete "Canada" and insert --California--.

Signed and sealed this 9th day of April 1974.

(SEAL)
Attest:

EDWARD M. FLETCHER, JR.　　　　　　C. MARSHALL DANN
Attesting Officer　　　　　　　　　Commissioner of Patents